United States Patent
Diao et al.

(10) Patent No.: US 7,099,640 B2
(45) Date of Patent: Aug. 29, 2006

(54) METHOD DISTINGUISHING LINE OF SIGHT (LOS) FROM NON-LINE OF SIGHT (NLOS) IN CDMA MOBILE COMMUNICATION SYSTEM

(75) Inventors: Xinxi Diao, Guangdong (CN); Fangfu Guo, Guangdong (CN)

(73) Assignee: Huawei Technologies Co., Ltd., (CN)

( * ) Notice: Subject to any disclaimer, the term of this patent is extended or adjusted under 35 U.S.C. 154(b) by 34 days.

(21) Appl. No.: 10/500,598

(22) PCT Filed: Mar. 29, 2002

(86) PCT No.: PCT/CN02/00220

§ 371 (c)(1),
(2), (4) Date: Jan. 17, 2005

(87) PCT Pub. No.: WO03/056849

PCT Pub. Date: Jul. 10, 2003

(65) Prior Publication Data

US 2005/0124368 A1    Jun. 9, 2005

(30) Foreign Application Priority Data

Dec. 30, 2001  (CN)  ................................ 01 1 45113

(51) Int. Cl.
*H04B 1/06*    (2006.01)
*H04B 1/68*    (2006.01)

(52) U.S. Cl. .................... 455/203; 455/67.16; 455/450; 455/451; 455/452.1; 455/456.1; 370/335; 370/342

(58) Field of Classification Search ............. 455/67.16, 455/203, 450, 451, 452.1, 456.1; 370/335, 370/342
See application file for complete search history.

(56) References Cited

U.S. PATENT DOCUMENTS

| 5,974,329 A * | 10/1999 | Wylie et al. ............. 455/456.1 |
| 6,421,334 B1 * | 7/2002 | Baines ....................... 370/342 |
| 2001/0014116 A1 | 8/2001 | Saito et al. |
| 2002/0132597 A1 * | 9/2002 | Peterzell et al. ............ 455/130 |

FOREIGN PATENT DOCUMENTS

EP    1126626 A2    2/2001

* cited by examiner

*Primary Examiner*—Nay Maung
*Assistant Examiner*—Tuan H. Nguyen

(57) ABSTRACT

The invention discloses a method that identifies whether a channel is LOS or NLOS in a mobile communication system. After coherent accumulation and non-coherent accumulation have been made by the system, first the method takes power difference between the direct path and the non-direct path in a same power delay profile to identify a channel; and then the result is further determined by $\bar{\tau}/\sigma$ difference of a LOS channel and a NLOS channel (where $\bar{\tau}$ and $\sigma$ is the mean delay and the RMS delay spread of a multipath power profile, respectively). A channel is determined as a LOS channel, if the power ratio of the Maximum Path to the Local Maximum Path is greater than a threshold K, and simultaneously the arrival time difference between the First Path and said Maximum Path is less than a time interval T; otherwise it is a NLOS channel. The method is easier to implement and compatible with the present mobile communication system.

15 Claims, 5 Drawing Sheets

METHOD DISTINGUISHING LINE OF SIGHT (LOS) FROM NON-LINE OF SIGHT (NLOS) IN CDMA MOBILE COMMUNICATION SYSTEM

CROSS-REFERENCE TO RELATED APPLICATIONS

This application is a National Stage of International Application No. PCT/CN02/00220, filed Mar. 29, 2002 and published in Chinese on Jul. 10, 2003 as WO 03/056849 A1. This application claims the benefit of Chinese Application No. 01145113.0, filed Dec. 30, 2001. The disclosure(s) of the above applications are incorporated herein by reference.

FIELD OF THE TECHNOLOGY

The invention generally relates to mobile communication technology, especially to a method that identifies whether a channel is a Line Of Sight (LOS) channel or a Non-Line Of Sight (NLOS) channel for a mobile station location in third generation cellular mobile communication system.

BACKGROUND OF THE INVENTION

In a Code Division Multiple Access (CDMA) mobile communication system, an important way to raise the estimation accuracy of mobile station location is to identify whether the channel is a LOS channel or a NLOS channel, since the delay estimation error caused by a NLOS channel is the most serious one of those factors that affect the estimation accuracy of a mobile station location. The LOS channel can be understood as the transmitter is line of sight with the receiver, and the NLOS channel can be understood as the transmitter is non-line of sight with the receiver.

M. P. Wylie first proposes technique that identifies a NLOS used for mobile station location in the article named "The Non-Line of Sight Problem in Mobile Location Estimation" [1]. In Sep. $9^{th}$, 1997, he proposes a patent (with number: U.S. Pat. No. 5,974,329) to the USPTO named "Method and System for Mobile Location Estimation" [2], which aims at the NLOS error correction in the mobile location estimation and takes the NLOS identifying technique as a main element of the invention. In his invention the main thinking to identify a NLOS is as follow.

(1) Make long time recorders for distance between a UE (User Equipment) and a base station measured in every base station;

(2) Make smooth processing for the amount of recorded data;

(3) Identify a NLOS with the fact that the variance measured in a NLOS (after smooth processing, it is caused by geomorphology feature) is much greater than the variance measured in a LOS (caused by system measurement error).

The NLOS identifying method proposed by [1] and [2] need to use the time correlation properties of a mobile station, i.e., the method is suitable for identifying LOS channel of a mobile station in a moving state, but it is unsuitable for identifying a LOS channel of a mobile station in a static state; furthermore, the method need to accumulate data for a longer period of time, which will cause a longer delay and is difficult to satisfy response time requirement of the FCC.

A patent (number CN 01105808.0) named "Method and Device for Identifying a NLOS channel in a CDMA cellular communication system" [3] has been applied by the applicant; in this patent, a LOS identifying method is proposed, which synthetically uses channel loss and multipath power profile to identify a LOS channel.

Although the method in [3] has overcome the disadvantage of the method in [1] and [2] which only identify the LOS at the moving state of a mobile station, but in [3], the method has not used the power difference between paths, and, the ratio of the mean delay and delay spread $\bar{\tau}/\sigma$ in a same power delay profile to identify a LOS, also the selected characteristic parameters are not simple and clear enough, so the implementation is relatively complex.

In the article: "Characterization of UHF multipath radio channels in factory buildings" [4] written by T. S. Rappaport, IEEE transaction on antenna and propagation, vol.37, no.8, pp.1058–1069, August, 1989, based on the indoor measured data, $\bar{\tau}/\sigma$ difference between LOS channel and NLOS channel at an indoor environment has been discussed, i.e., regularity of multipath power profile in LOS channel and NLOS channel at the indoor environment has been discussed; the conclusion is that less $\bar{\tau}/\sigma$ shows that energy is concentrated on the first path and larger $\bar{\tau}/\sigma$ shows that energy is concentrated on the middle and trail part of the power delay profile. In reference [4], the discussion about $\bar{\tau}/\sigma$ is based on that the LOS distance is known and thereby the arriving time of LOS path can be computed; but in real the detected first path may not be the LOS path and also how to compute and use regularity of $\bar{\tau}/\sigma$ has not been discussed there.

SUMMARY OF THE INVENTION

Objective of the invention is to design a method to identify a LOS channel in a CDMA mobile communication system. With this method based on multipath searching (including de-spread, coherent accumulation and non-coherent accumulation), it can be identified that a channel is whether a LOS channel or a NLOS channel.

One purpose of the invention is to provide a method to identify whether a channel is a LOS channel or NLOS channel according to the power difference between a direct path and a non-direct path on the same power delay profile.

Another purpose of the invention is to provide a method to further identify whether a channel is a LOS channel or a NLOS channel by means of $\bar{\tau}/\sigma$ difference between a LOS channel and a NLOS channel (wherein $\bar{\tau}$ is a mean delay of a multipath power profile, and $\sigma$ is a root-mean-square (RMS) delay spread of the multipath power profile), based on the result of above method.

A method for identifying whether a channel is a LOS channel or a NLOS channel in a mobile communication system, comprises:

A. reading in a power delay profile;

B. selecting a path with maximum power amplitude, i.e. a Maximum Path, from the power delay profile;

C. estimating an average noise power and arrival time of a First Path and the Maximum Path;

D. detecting a Local Maximum Path value within a searching window, and detecting whether a power ratio of the Maximum Path to the Local Maximum Path is greater than a threshold K;

E. detecting whether an arrival time difference between the First Path and the Maximum Path is less than a time interval T;

F. if the power ratio of the Maximum Path to the Local Maximum Path is greater than the threshold K, and simultaneously the arrival time difference between the First Path and the Maximum Path is less than the time interval T, determining the channel being a LOS channel; otherwise determining the channel being a NLOS channel.

After the step F, further comprises a step of detecting whether the NLOS channel determined by Step F is a LOS channel or a NLOS channel, by $\bar{\tau}/\sigma$ difference of the power delay profile between the LOS channel and the NLOS channel, which comprises:

G. computing $\tau_i$ that is an arrival time difference between a $i^{th}$ detectable path and first detectable path;

H. according to following formulas, computing mean delay $\bar{\tau}$ and root-mean-square delay spread $\sigma$, $$\bar{\tau} = \frac{\sum_{i=1}^{n} \tau_i * p_i}{\sum_{i=1}^{n} p_i} \quad \bar{\tau}^2 = \frac{\sum_{i=1}^{n} (\tau_i)^2 * p_i}{\sum_{i=1}^{n} p_i} \quad \sigma = \sqrt{\bar{\tau^2} - (\bar{\tau})^2} \; ;$$

I. computing $\bar{\tau}/94$ that is a ratio of mean delay to root-mean-square delay spread of power delay profile; if $\bar{\tau}/\sigma$ is less than Delta($\Delta$), determining the channel being a LOS channel, and if $\bar{\tau}/\sigma$ is not less than Delta ($\Delta$), determining the channel being a NLOS channel;

wherein $\bar{\tau}$ is a mean delay of a power delay profile and $\sigma$ is a root-mean-square time-delay spread of the power delay profile; wherein n is number of detectable paths, $p_i$ is the $i^{th}$ path power, and i is 1 to n.

Wherein the Delta is taken between 0.5 to 1.

Wherein Step D further comprises, if there is no detectable path in the searching window of the Local Maximum Path, taking Theta ($\theta$) multiples of the average noise power as the Local Maximum Path power.

Wherein the Theta ($\theta$) is taken 2.

In Step D, the said Local Maximum Path is selected from a range within Alpha ($\alpha$) microsecond that delays the Maximum Path; the Alpha ($\alpha$) width is greater than one chip.

In Step D, the threshold K in indoor environment, is set less than the threshold in outdoor environment, and the threshold in outdoor environment is set 10.

Wherein Step D further comprises, dividing the threshold K into K1 and K2, wherein K1>K2;

wherein Step F further comprises, if the power ratio of the Maximum Path to the Local Maximum Path is greater than K1, determining the channel as a LOS channel; if the ratio is less than K2, determining that the channel is a NLOS channel; and if said ratio is between K1 and K2, determining that the channel is an undetermined channel.

The threshold K1 is taken 10 and K2 is taken 5.

The time interval T is within three chips, and typically two chips.

Comparing with the technical scheme in [3], the technical scheme of the invention uses the power difference between paths on the same power delay profile, and uses $\bar{\tau}/\sigma$ to identify a LOS channel ($\bar{\tau}$ is the mean delay and $\sigma$ is the RMS delay spread of the multipath power profile).

A special feature of the invention is that the method for identifying a LOS channel can be used to a mobile station (terminal) either in a moving state or in a static state. Implementation of the method deploys the present signal processing techniques for a communication system, such as de-spread, coherent accumulation and non-coherent accumulation etc., so implementation is simple and compatible with various mobile communication systems.

Simulation shows that the method which uses the power difference between a direct path and a non-direct path on same power delay profile can effectively differentiate a LOS channel or a NLOS channel, but also the method which uses $\bar{\tau}/\sigma$ difference between a LOS channel and a NLOS channel and is based on the result of above method can effectively differentiate a LOS channel or a NLOS channel. When the above methods are involved in the location estimation algorithm, the mobile station positioning accuracy is obviously increased.

The method for identifying a LOS channel may also be used to identify a channel in high speed data transmission.

BRIEF DESCRIPTION OF THE DRAWINGS

FIG. 1 shows diagrams of power difference between a LOS path and a NLOS path on a same power delay profile; wherein FIG. 1a is typical power delay profile of a LOS channel, and FIG. 1b is typical power delay profile of a NLOS channel.

FIG. 2 shows diagrams of $\bar{\tau}/\sigma$ difference between a LOS channel and a NLOS channel; wherein FIG. 2a is the curve obtained by taking theoretical arrival time of a LOS path as the reference point, and FIG. 2b is the curve obtained by taking arrival time of the measured First Path as the reference point.

EMBODIMENTS OF THE INVENTION

The invention will be described in more detail with reference to the drawings.

Figure 1:
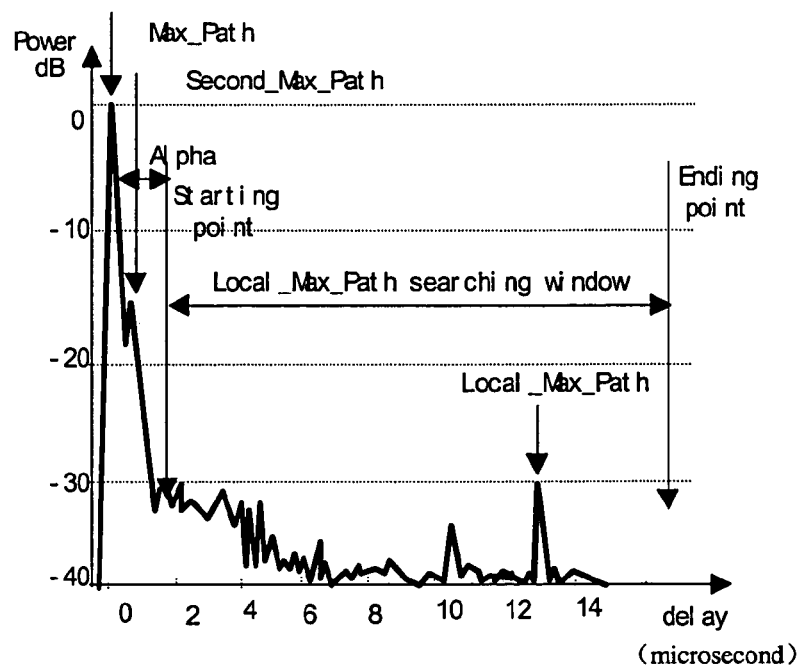
Figure 1:
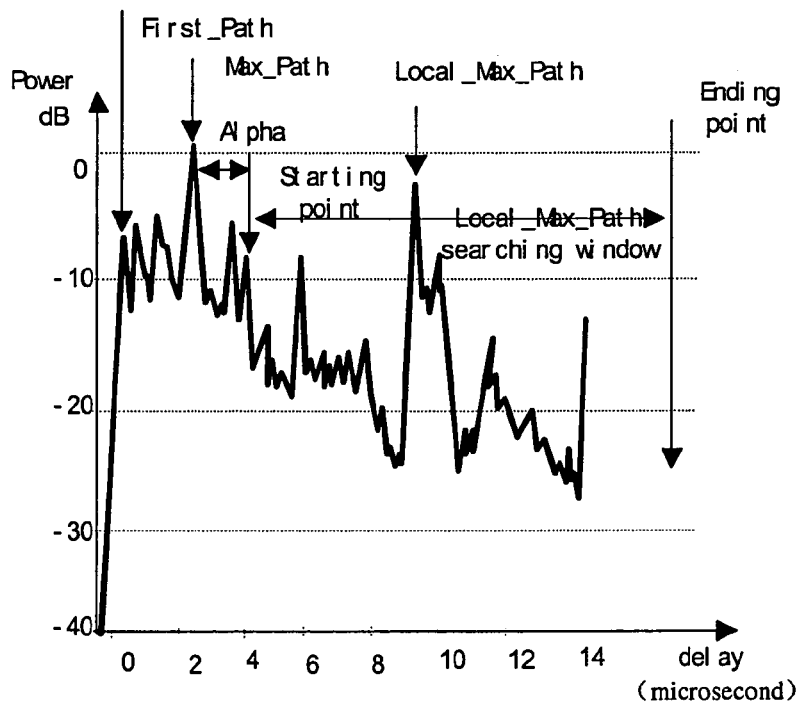

FIG. 1 shows the power difference of a LOS path and a NLOS path on a same power delay profile. The abscissa is the relative delay with microsecond as a unit; the ordinate is the power with dB as a unit. In FIG. 1, the First_Path is the first path, the Max_Path is the maximum power amplitude path and the Second_Max_Path is the second power amplitude path; the Alpha ($\alpha$) is an interval width and the Local_Max_Path is the local maximum power amplitude path; the searching window for the Local_Max_Path is from the starting point to the ending point.

FIG. 1a is a typical power delay profile of a LOS channel after having been processed with coherent accumulation and non-coherent accumulation; FIG. 1b is a typical power delay profile of a NLOS channel after having been processed with coherent accumulation and non-coherent accumulation.

As shown in FIG. 1a, the characteristics of a LOS channel power delay profile are: at the beginning location or 1 to 2 chips delay of power delay profile, there is a strongest path (Max_Path) of which strength is Ricean-distributed; within interval Alpha ($\alpha$) that directly follows behind the strongest path, there are quasi-LOS paths caused by strong reflection of terrain, and amplitudes of them have no great difference with the amplitude of the strongest path but they are attenuated rapidly; after Alpha ($\alpha$), there are typical NLOS paths and the strength of them is Rayleigh-distributed, and the Local_Max_Path is searched in the searching window (from the starting point to the ending point). Measurement shows the Local_Max_Path amplitude (−30 dB in FIG. 1a) is obviously lower than the Max_Path amplitude (0 dB in FIG. 1a), and in general the Local_Max_Path amplitude is lower than the Max_Path amplitude more than 10 dB (it is 30 dB in FIG. 1a). The difference of these two amplitudes is a base to identify a LOS channel in this invention.

As shown in FIG. 1b, the characteristics of a NLOS channel power delay profile are: at the beginning location or 1 to 2 chips delay of it, there is the first path First_Path, then the strongest path Max_Path, and then an Alpha ($\alpha$) interval; after the Alpha ($\alpha$) interval they are a typical NLOS paths and the Local_Max_Path is searched in this searching window (from the starting point to the ending point as shown in FIG. 1b). Measurement shows that there is no obviously difference between the amplitude of the Local_Max_Path and the amplitude of the Max_Path; this feature is a base to identify a NLOS channel in this invention.

Figure 2:
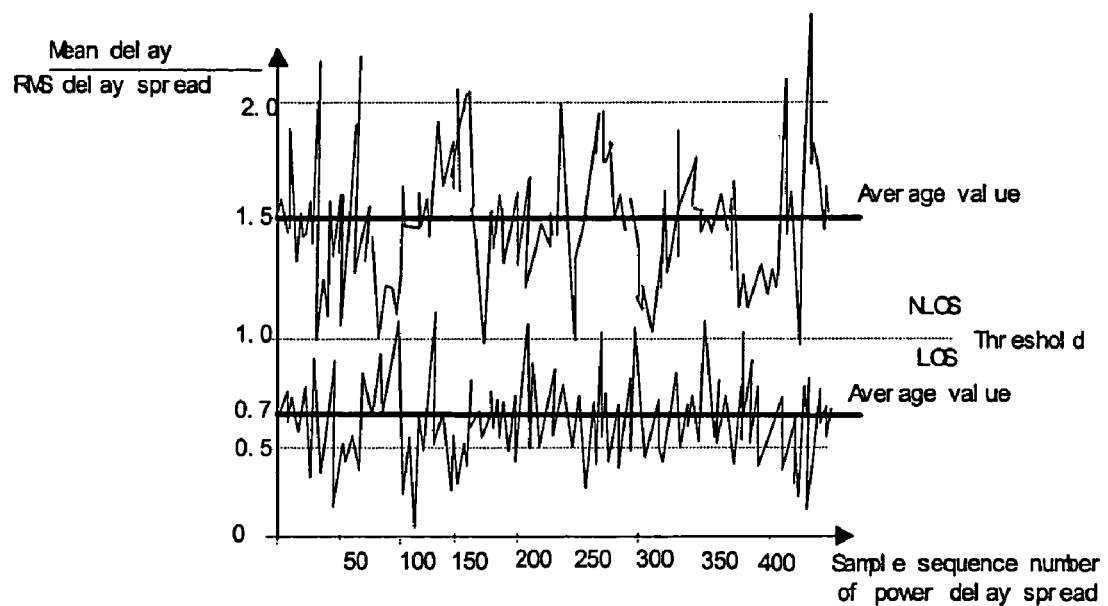
Figure 2:
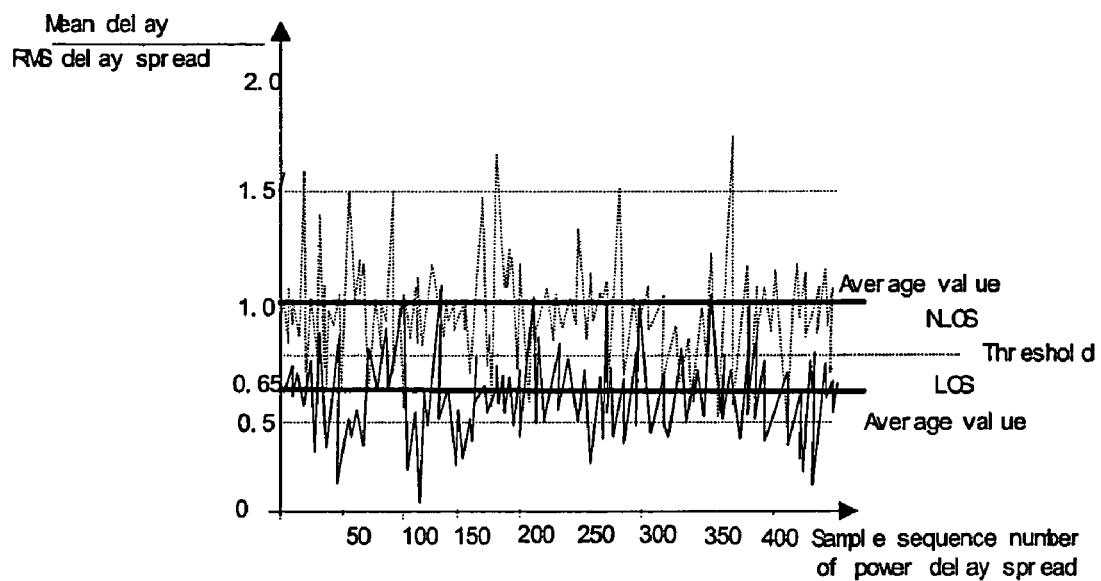

FIG. 2 shows the $\bar{\tau}/\sigma$ difference of the power delay profile for a LOS channel and a NLOS channel (wherein $\bar{\tau}$ is a mean delay of a multipath power profile, and $\sigma$ is a root-mean-square (RMS) delay spread of the multipath power profile). In FIG. 2, the abscissa is a sample sequence number of the power delay spread, i.e. the power delay spread sequence number; and the ordinate is the ratio of $\bar{\tau}/\sigma$, i.e. a mean delay/a RMS time-delay spread.

FIG. 2a takes the arriving time of the LOS path as the starting point to compute the values of $\bar{\tau}/\sigma$ curve for LOS channel and NLOS channel. It is seen that the average value of $\bar{\tau}/94$ for the LOS channel is about 0.65 under the threshold (it is 1.0 as shown in FIG. 2), and the average value of $\bar{\tau}/\sigma$ for the NLOS channel is about 1.5 above the threshold; so taking $\bar{\tau}/\sigma=1$ as a threshold, it is easier to differentiate the two kinds of channels.

FIG. 2b takes the first path having been measured as the starting point to compute the values of $\bar{\tau}/\sigma$ curves for LOS channel and NLOS channel; the real-line shows the $\bar{\tau}/\sigma$ curve of the LOS channel, and the dot-line shows the $\bar{\tau}/\sigma$ curve of the NLOS channel. Comparing FIG. 2a and FIG. 2b, it is shown that for the LOS channel the average value in FIG. 2b is decreased a little than in FIG. 2a (it is 0.65 or so), but for the NLOS channel the average value in FIG. 2b is obviously decreased than in FIG. 2a (it is decreased from 1.5 to 1.0, decreasing about 0.5).

FIG. 2b shows that, there is an ambiguous zone for $\bar{\tau}/\sigma$ curve of the LOS channel and $\bar{\tau}/\sigma$ curve of the NLOS channel, but when the $\bar{\tau}/\sigma$ value is less than a specific value (it is 0.65 in FIG. 2b), it is determined that the channel is a LOS channel. This is the base of the invention to use $\bar{\tau}/\sigma$ value for further identifying a LOS channel after having been identified by the amplitude difference between different paths.

Figure 3:
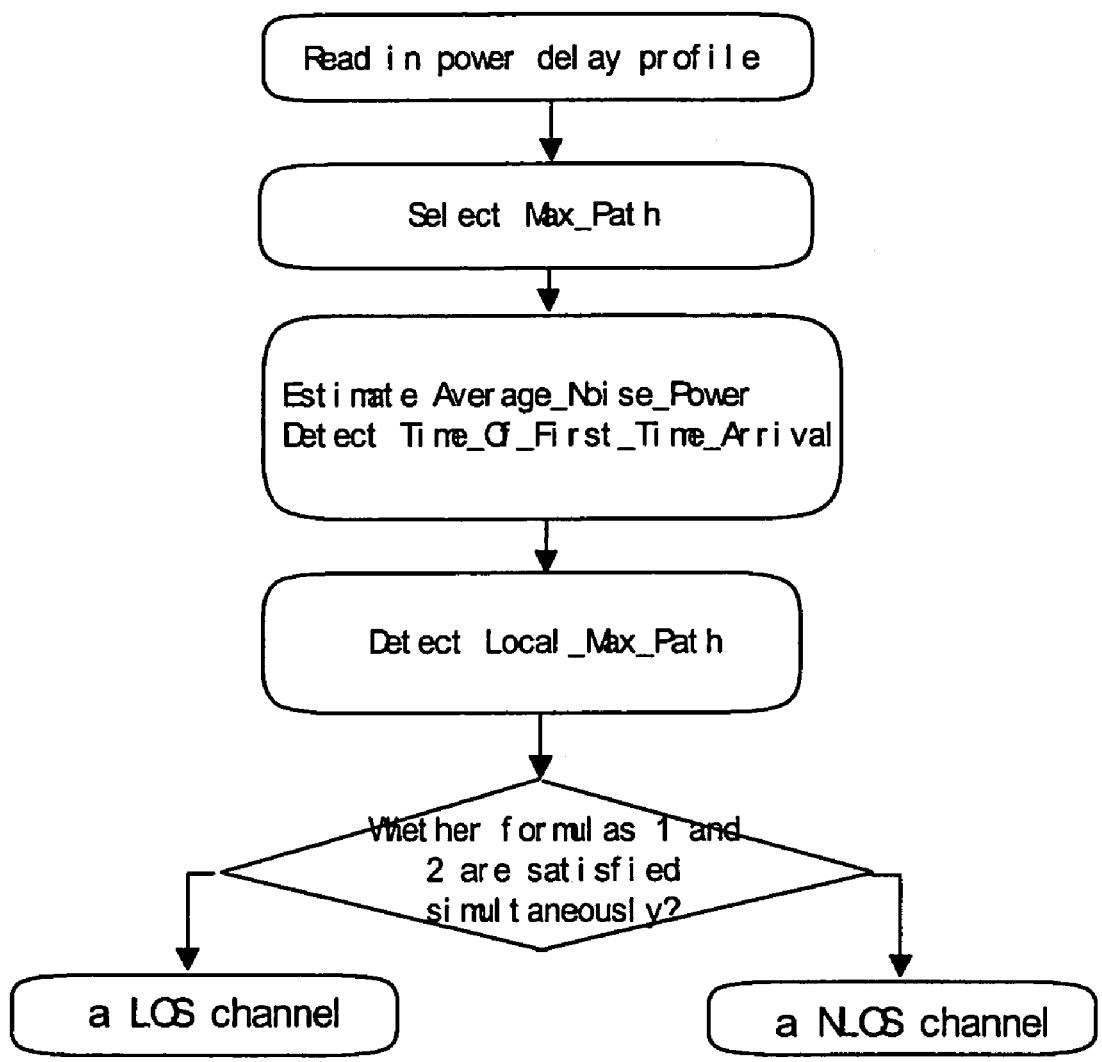
FIG. 3 shows a flowchart to determinate the LOS/NLOS channel based on power difference between specific paths.

FIG. 3 shows a basic flowchart to identify a LOS channel or a NLOS channel by using power strength (amplitude) difference between a direct path and a non-direct path.

In the first step, read in the power delay profile and extract its characteristic parameters; said power delay profile is obtained after the system has performed the coherent accumulation and non-coherent accumulation, and the outputs of the coherent accumulation and non-coherent accumulation are taken as a extracted basis of the characteristic parameters.

In the second step, pick up the strongest path Max_Path; the Max_Path is the path with maximum power amplitude (power strength) in the whole power delay profile.

In the third step, evaluate the Average_Noise_Power, the Time_Of_First_Path_Arrival and the Time_Of_Max_Path_Arrival. With the present mature technique, the Average_Noise_Power is evaluated in two steps: first, take N (N=5, for example) strongest paths away from the power delay profile, second, make average within the searching window for the power delay profile in which N paths have been taken away; wherein way to take a strongest path away is as follow: select the strongest path on the power delay profile, set values of samples in the range that covers three sample points at both side of the strongest path sample to zero, thereby one path power of the power delay profile having been taken away, which will be used for taking away the strongest path next time, is obtained; repeat N−1 times of the above procedure to obtain the power delay profile in which the N strongest paths have been taken away (when the number of paths is less than N, some noise powers will be taken away, which does not affect application).

In the fourth step, determine the Local_Max_Path that must be selected at the range that has Alpha ($\alpha$) microsecond delay from the Max_Path; if there is no detectable path in said range, take Theta ($\theta$) (such as 2) multiple of noise average power as the Local_Max_Path value. The purpose to take said range that has Alpha ($\alpha$) microsecond delay from the Max_Path is to avoid the strong reflect path that follows the Max_Path in a LOS channel; the Alpha ($\alpha$) should be taken more than one chip width.

In the fifth step, make detection according to the following two formulas:

$$\text{Max\_Path/Local\_Max\_Path} > K \qquad (1)$$

$$\text{Time\_Of\_First\_Path\_Arrival} - \text{Time\_Of\_Max\_Path\_Arrival} < T \qquad (2)$$

Formula (1) detects whether a ratio of the strongest path and the local strongest path (Max_Path/Local_Max_Path) is greater than a threshold K. For the Local_Max_Path, there are two possible situations: there is a local strongest path or there is not a local strongest path; in the later situation, Theta ($\theta$) multiple of the noise average power ($\theta=2$) is taken as its value. For indoor and outdoor environment, the threshold K is different; usually the indoor threshold is less than the outdoor threshold, and here K is taken 10 as the outdoor threshold.

Formula (2) detects whether the arriving time difference between the first path and the maximum path is less than a setting value T; T is within three chips time and typically it is taken two chips time.

In the sixth step, if formulas (1) and (2) are satisfied simultaneously, determine that it is a LOS channel; if they are not satisfied simultaneously, determine that it is a NLOS channel.

In real, the power delay profile is various; in some specific environments, the Max_Path/Local_Max_Path of the LOS channel may overlap the Max_Path/Local_Max_Path of the NLOS channel. For differentiation, in this situation the threshold K is divided into two values K1 and K2, wherein K1>K2, for example K1 is taken 10 and K2 is taken 5.

When (Max_Path/Local_Max_Path)>K1, it is a LOS channel; when (Max_Path/Local_Max_Path)<K2, it is a NLOS channel; and when K1>(Max_Path/Local_Max_Path)>K2, it is an undetermined channel.

Figure 4:
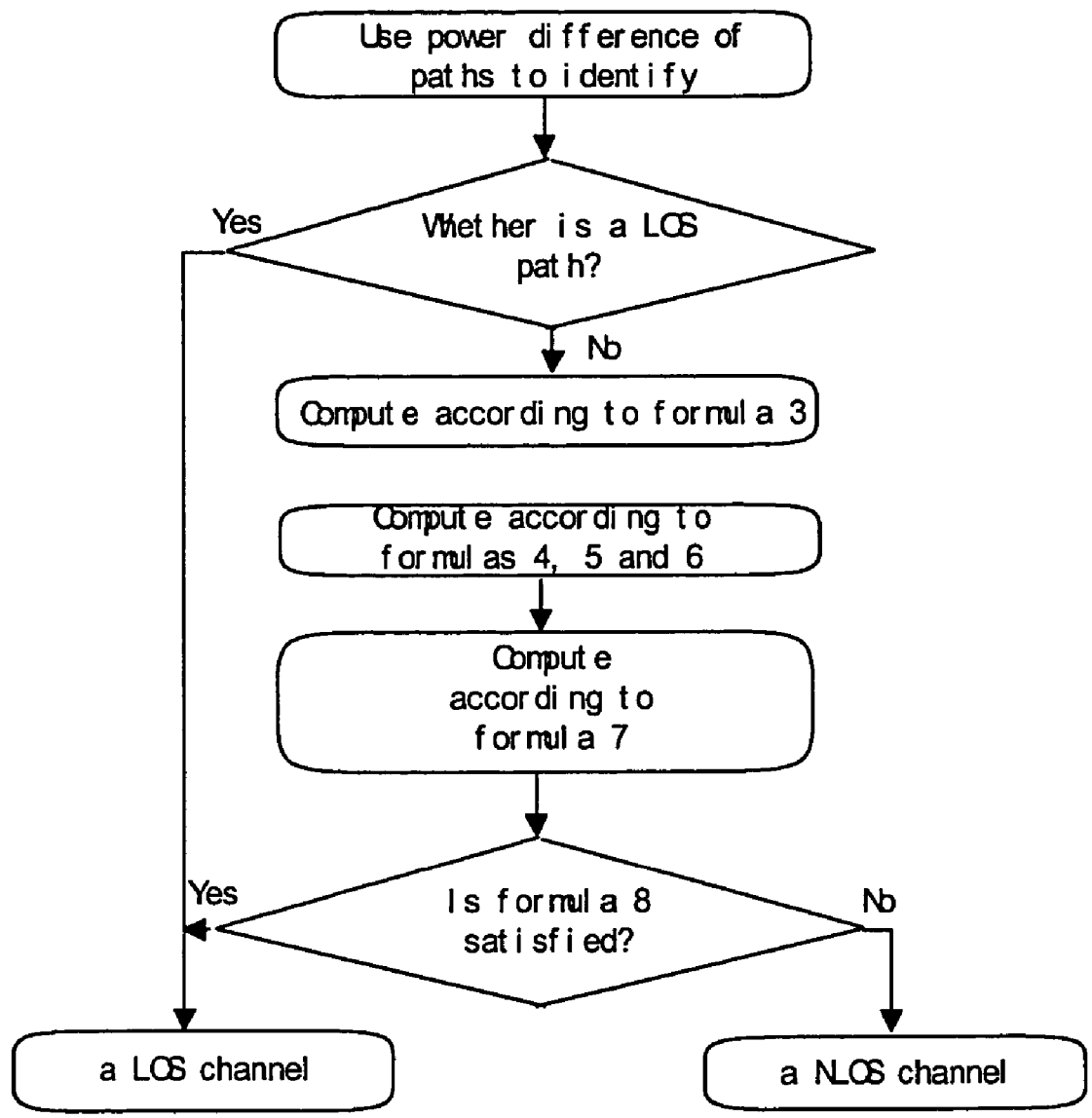
FIG. 4 shows a flowchart to identify a NLOS channel synthetically using power difference between paths and $\bar{\tau}/\sigma$.

FIG. 4 shows a flowchart for identifying a NLOS channel by using power difference between paths and $\bar{\tau}/\sigma$. The flowchart is divided into two parts; the first part uses power difference between paths to identify the LOS channels, i.e., the first part makes detection by means of amplitude difference between a direct path and a non-direct path; then the second part further identifies the NLOS channels having been identified by the first part to determine the LOS channel or the NLOS channel.

The first step and second step detect whether the channel is a LOS channel or a NLOS channel by using amplitude difference; this is same as the procedure described in FIG. 3.

During selection of the threshold K, it is kept in mind that great missing detection probability is taken to ensure that less false detection probability. The missing detection means that parts of LOS channels are missed detecting into NLOS channels, and the false detection means that NLOS channels are detected into LOS channels falsely. Thereby the result is that there are some power delay profiles of LOS channel not fulfilling formula (1), and these LOS channels should be further detected by the $\bar{\tau}/\sigma$ difference of the power delay profile between a LOS channel and a NLOS channel. This is what the third step to seventh step will be done in FIG. 4.

Third step computes the delay of each path (detectable $i^{th}$ path) to the first detectable path (the First Path) with formula (3), i.e. computing the arrival time difference $\tau_i$ between the $i^{th}$ path and the First Path.

$$\tau_i = \text{Time\_Of\_ith\_Path\_Arrival} - \text{Time\_Of\_First\_Path\_Arrival} \quad (3)$$

Fourth step computes the mean delay $\bar{\tau}$ and the delay spread $\sigma$. Theoretically, the mean delay $\bar{\tau}$ and the delay spread $\sigma$ are defined as followings:

$$\bar{\tau} = \frac{\sum_{i=1}^{n} \tau_i * p_i}{\sum_{i=1}^{n} p_i} \quad (4)$$

$$\overline{\tau^2} = \frac{\sum_{i=1}^{n} (\tau_i)^2 * p_i}{\sum_{i=1}^{n} p_i} \quad (5)$$

$$\sigma = \sqrt{\overline{\tau^2} - (\bar{\tau})^2} \quad (6)$$

Wherein n is the number of detectable paths, $\tau_i$ is the delay of the $i^{th}$ path to arrival time of the LOS path (if it exists), and $p_i$ is the power of the $i^{th}$ path.

In real, general speaking, it is impossible to measure a LOS path arrival time defined in the formulas. In order to compute $\bar{\tau}$, the invention takes the real measured time of the First Path arrival time (Time_Of_First_Path_Arrival–Time) as a starting point, and the obtained $\bar{\tau}$ is less than the theoretical mean delay obtained by taking a delay to which the direct distance between the base station and mobile station corresponds as the starting point, but in a LOS environment this decrement is very little. Nevertheless, in a NLOS environment there is a larger difference between the $\bar{\tau}$ computed from formula (3) and the real $\bar{\tau}$; this can be seen by comparing FIG. 2a and FIG. 2b.

Since $\sigma$ is kept unchanged, in the NLOS environment the computed $\bar{\tau}/\sigma$ value is obviously less than the real value, but in the LOS environment the computed $\bar{\tau}/\sigma$ value is not obviously less than the real value; the result is that the difference of $\bar{\tau}/\sigma$ value between the LOS environment and the NLOS environment is decreased, and this will decrease the identification accuracy.

Fifth step computes $\bar{\tau}/\sigma$ value with formula (7) and determines what kind of the channel is according to an area where the computed $\bar{\tau}/\sigma$ value located.

$$\text{Gama} = \bar{\tau}/\sigma \quad (7)$$

Sixth step compares the Gama and Delta with formula (8) to identify a NLOS channel.

$$\text{Gama} = \bar{\tau}/\sigma < \text{Delta}(\Delta) \quad (8)$$

Seventh step may take Delta ($\Delta$)=0.6 (Delta may take a value between 0.5 to 1), and determines a LOS channel for those that the $\bar{\tau}/\sigma$ are less than 0.6 and a NLOS channel for those that the $\bar{\tau}/\sigma$ are not less than 0.6.

Figure 5:
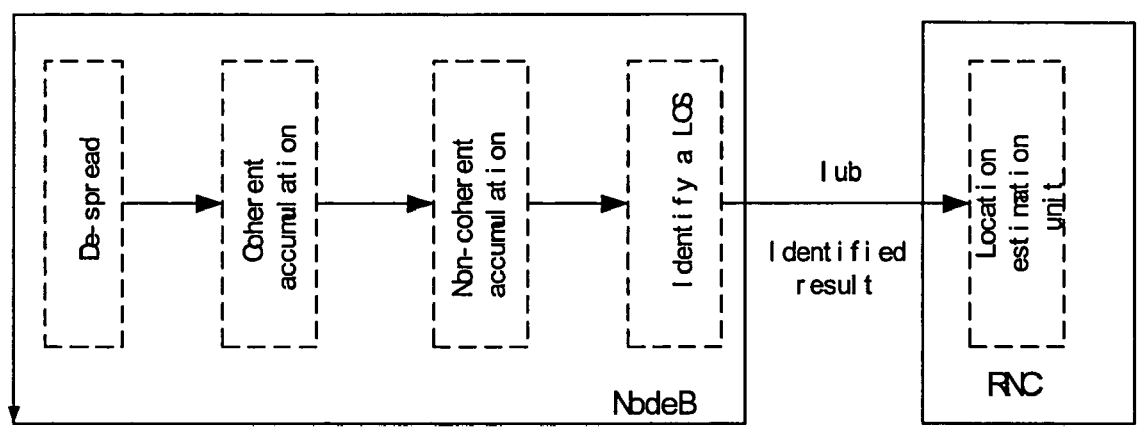
FIG. 5 shows a system diagram of an embodiment of the invention which is used to identify a LOS channel.

FIG. 5 is an embodiment of the invention. In FIG. 5, the LOS identification module in the base station (NodeB) identifies whether a channel is a LOS channel or a NLOS channel for a result of de-spread, coherently and de-coherently accumulated; the identified result is sent up, through interface Iub, to the location estimation unit in the Radio Network Controller (RNC), which is called base station controller in GSM; the location estimation unit will use the identified result to improve the location estimation accuracy.

Besides implementing the LOS identification in the NodeB, the LOS identification module may be put in the User Equipment and the identified result is sent to the NodeB and RNC through the Uu interface.

The method for identifying a LOS channel and a NLOS channel in the invention may also be used to identify a channel in high speed data transmission.

The invention claimed is:

1. A method for identifying whether a channel is a LOS channel or a NLOS channel in a mobile communication system, comprising:
    A. reading in a power delay profile;
    B. selecting a path with maximum power amplitude, i.e. a Maximum Path, from the power delay profile;
    C. estimating an average noise power and arrival time of a First Path and the Maximum Path;
    D. detecting a Local Maximum Path value within a searching window, and detecting whether a power ratio of the Maximum Path to the Local Maximum Path is greater than a threshold K;
    E. detecting whether the arrival time difference between the First Path and the Maximum Path is less than a time interval T;
    F. if the power ratio of the Maximum Path to the Local Maximum Path is greater than the threshold K, and simultaneously the arrival time difference between the First Path and the Maximum Path is less than the time interval T, determining the channel being a LOS channel; otherwise determining the channel being a NLOS channel.

2. The method according to claim 1, after the step F, further comprises a step of detecting whether the NLOS channel determined by Step F is a LOS channel or a NLOS channel, by $\bar{\tau}/\sigma$ difference of the power delay profile between the LOS channel and the NLOS channel, which comprises:
    G. computing $\tau_i$ that is an arrival time difference between a $i^{th}$ detectable path and first detectable path;
    H. according to following formulas, computing mean delay $\bar{\tau}$ and root-mean-square delay spread $\sigma$ of each detectable path, $$\bar{\tau} = \frac{\sum_{i=1}^{n} \tau_i * p_i}{\sum_{i=1}^{n} p_i} \quad \overline{\tau^2} = \frac{\sum_{i=1}^{n} (\tau_i)^2 * p_i}{\sum_{i=1}^{n} p_i} \quad \sigma = \sqrt{\overline{\tau^2} - (\bar{\tau})^2} \; ;$$

I. computing $\bar{\tau}/\sigma$ that is a ratio of mean delay to root-mean-square delay spread of power delay profile; if $\bar{\tau}/\sigma$ is less than Delta($\Delta$), determining the channel being a LOS channel, and if $\bar{\tau}/\sigma$ is not less than Delta ($\Delta$), determining the channel being a NLOS channel;
    wherein $\bar{\tau}$ is the mean delay of a power delay profile and $\sigma$ is a root-mean-square delay spread of the power delay profile; wherein n is number of detectable paths, $p_i$ is the $i^{th}$ path power, and i is 1 to n.

3. The method according to claim 2, wherein Step I comprises taking the Delta between 0.5 to 1.

4. The method according to claim 1, wherein the Step D further comprises, if there is no detectable path in the searching window of the Local Maximum Path, taking Theta (θ) multiples of the average noise power as the Local Maximum Path power.

5. The method according to claim 4, the Theta (θ) is taken 2.

6. The method according to claim 1, wherein Step D comprises, selecting the said Local Maximum Path from a range within Alpha (α) microsecond that delays the Maximum Path; wherein the Alpha (α) width is greater than one chip.

7. The method according to claim 1, wherein Step D comprises, setting the threshold K in indoor environment less than the threshold in outdoor environment, and setting the threshold in outdoor environment being 10.

8. The method according to claim 1, wherein Step D further comprises, dividing the threshold K into K1 and K2, wherein K1>K2;

wherein Step F further comprises, if the power ratio of the Maximum Path to the Local Maximum Path is greater than K1, determining the channel as a LOS channel; if the ratio is less than K2, determining that the channel is a NLOS channel; and if said ratio is between K1 and K2, determining that the channel is an undetermined channel.

9. The method according to claim 8, the threshold K1 is taken 10 and K2 is taken 5.

10. The method according to claim 1, wherein Step E comprises, taking the time interval T being within three chips, and typically two chips.

11. The method according to claim 2, wherein the Step D further comprises, if there is no detectable path in the searching window of the Local Maximum Path, taking Theta (θ) multiples of the average noise power as the Local Maximum Path power.

12. The method according to claim 2, wherein Step D comprises, selecting the said Local Maximum Path from a range within Alpha (α) microsecond that delays the Maximum Path; wherein the Alpha (α) width is greater than one chip.

13. The method according to claim 2, wherein Step D comprises, setting the threshold K in indoor environment less than the threshold in outdoor environment, and setting the threshold in outdoor environment being 10.

14. The method according to claim 2, wherein Step D further comprises, dividing the threshold K into K1 and K2, wherein K1>K2;

wherein Step F further comprises, if the power ratio of the Maximum Path to the Local Maximum Path is greater than K1, determining the channel as a LOS channel; if the ratio is less than K2, determining that the channel is a NLOS channel; and if said ratio is between K1 and K2, determining that the channel is an undetermined channel.

15. The method according to claim 2, wherein Step E comprises, taking the time interval T being within three chips, and typically two chips.

* * * * *